Figure 1:
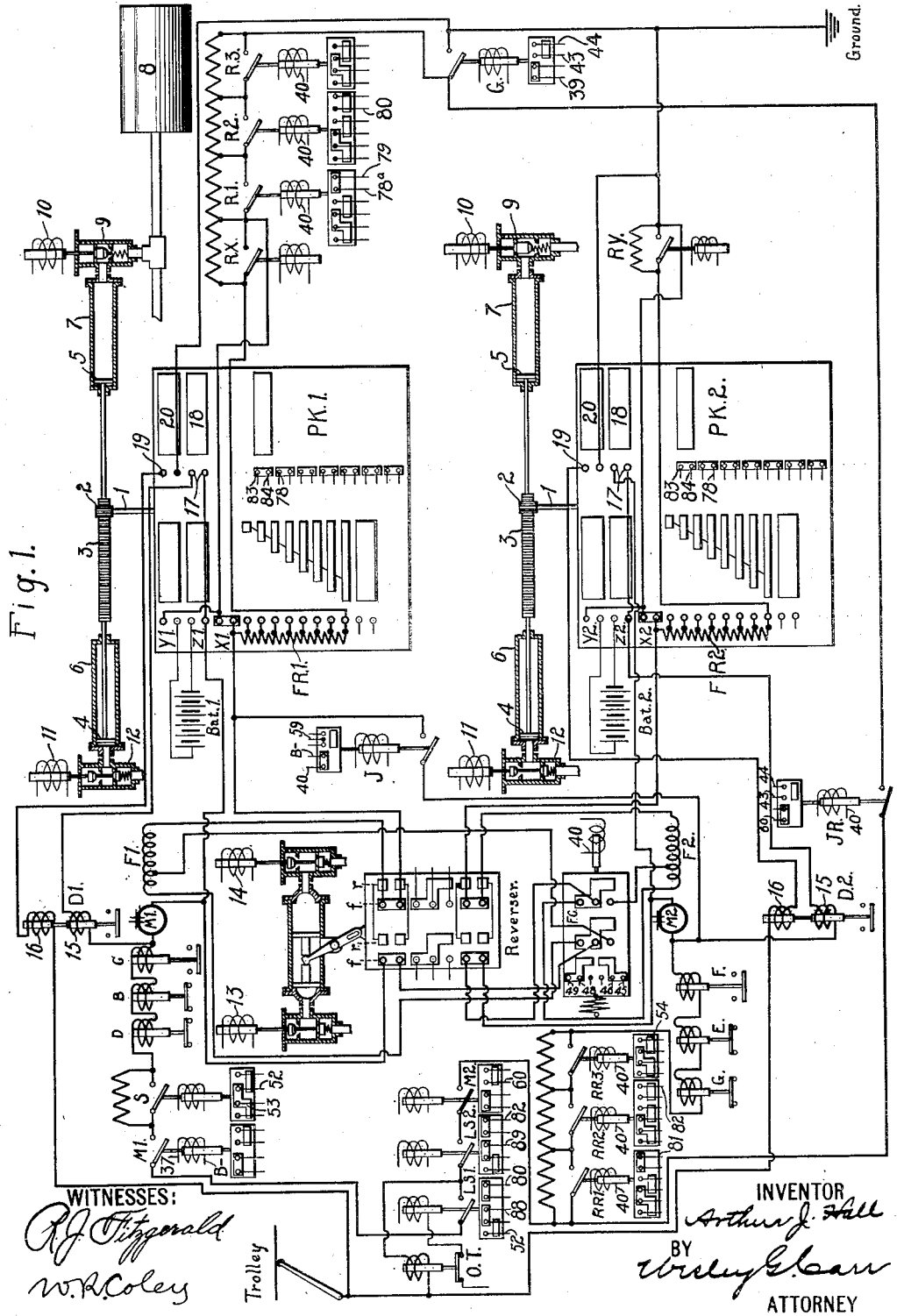

A. J. HALL.
CONTROL SYSTEM.
APPLICATION FILED APR. 25, 1914. RENEWED JUNE 19, 1917.

1,245,223.

Patented Nov. 6, 1917.
3 SHEETS—SHEET 3.

WITNESSES:
Fred. A. Lind
W. R. Coley

INVENTOR
Arthur J. Hall
BY
ATTORNEY

UNITED STATES PATENT OFFICE.

ARTHUR J. HALL, OF WILKINSBURG, PENNSYLVANIA, ASSIGNOR TO WESTINGHOUSE ELECTRIC AND MANUFACTURING COMPANY, A CORPORATION OF PENNSYLVANIA.

CONTROL SYSTEM.

1,245,223.  Specification of Letters Patent.  Patented Nov. 6, 1917.

Application filed April 25, 1914, Serial No. 834,545. Renewed June 19, 1917. Serial No. 175,713.

*To all whom it may concern:*

Be it known that I, ARTHUR J. HALL, a subject of the King of Great Britain, and a resident of Wilkinsburg, in the county of Allegheny and State of Pennsylvania, have invented a new and useful Improvement in Control Systems, of which the following is a specification.

My invention relates to systems of electric motor control, and it has special reference to such systems as are adapted for use in electric railway service.

Another object of my invention is to provide an automatic control system of the regenerative type wherein the control circuits are simplified, in comparison with prior systems of the same general class.

Another object of my invention is to provide particularly simple, effective and reliable means for automatically maintaining a substantially constant regenerated current as the motor speed decreases, whereby peaks of current are eliminated, even upon a sudden drop of line voltage, and whereby certain circuit changes are accomplished more rapidly and positively than heretofore, thus increasing the efficiency of the system, as hereinafter explained in detail.

A further object of my invention is to provide an automatic control system of the above-indicated character which shall embody all the well-known advantages of regenerative control in a higher degree than has obtained in the prior art.

While my invention is particularly adapted for the control of railway vehicles, it is not limited to any class of service and may be utilized in the control of automobiles and other road vehicles, or in the control of cranes, hoists and other electrically-operated devices. My system is also especially applicable to multiple unit train systems of control.

In order to adapt the system of control for this class of service and to secure a maximum braking effort without injuring the electric motors or the other apparatus with which the vehicle is equipped, I have provided automatic means, in the form of a differential relay switch, for automatically connecting a motor to the supply circuit when the electromotive force generated at its terminals bears a predetermined relation to the voltage of the supply circuit.

I also employ automatic means for regulating the field excitation of the motor during the regenerative period, whereby a substantially constant braking current is delivered to the supply circuit. The means in question comprises a main line switch that is adapted to insert in circuit, or to short-circuit, a predetermined resistance, the switch being controlled through a high-current limit switch, thus inserting resistance when the current tends to increase beyond a predetermined amount and short-circuiting the resistance at other times, as broadly claimed in a hereinafter identified co-pending application. I also employ other automatic step-by-step means for regulating the field current during the braking period, such as is described in the co-pending application of Norman W. Storer, Serial No. 724,068, filed October 5, 1912, and assigned to the Westinghouse Electric and Manufacturing Company. In operation, it has been found that the short-circuiting switch referred to above flutters open and closed like the regulating contact member of a Tirrill regulator, thus serving to maintain a substantially constant current, in a well-known manner. In addition to the foregoing, I have so interlocked the various control switches and apparatus of the system as to permit of series-parallel operation of the motors, in accelerating the vehicle, by adjusting the master controller in one direction, and of automatic adjustment of the circuits for regenerative braking accompanied by independent connection of the motors to the circuit at the proper time, by throwing the master controller in the opposite direction. Moreover, if desired, automatic application of air brakes, when the field regulation has reached its limit and the vehicle speed is relatively low, may readily be accomplished, as disclosed in the above-mentioned pending application.

Figure 1 of the accompanying drawings is a diagrammatic view of a system of electric motor control embodying my invention, the main circuit connections and the switches and control apparatus which are directly associated therewith being shown complete according to the usual diagrammatic methods of representation. The control circuits are, however, indicated merely by appropriately designated lines, in order to avoid confusion.

Figure 2:
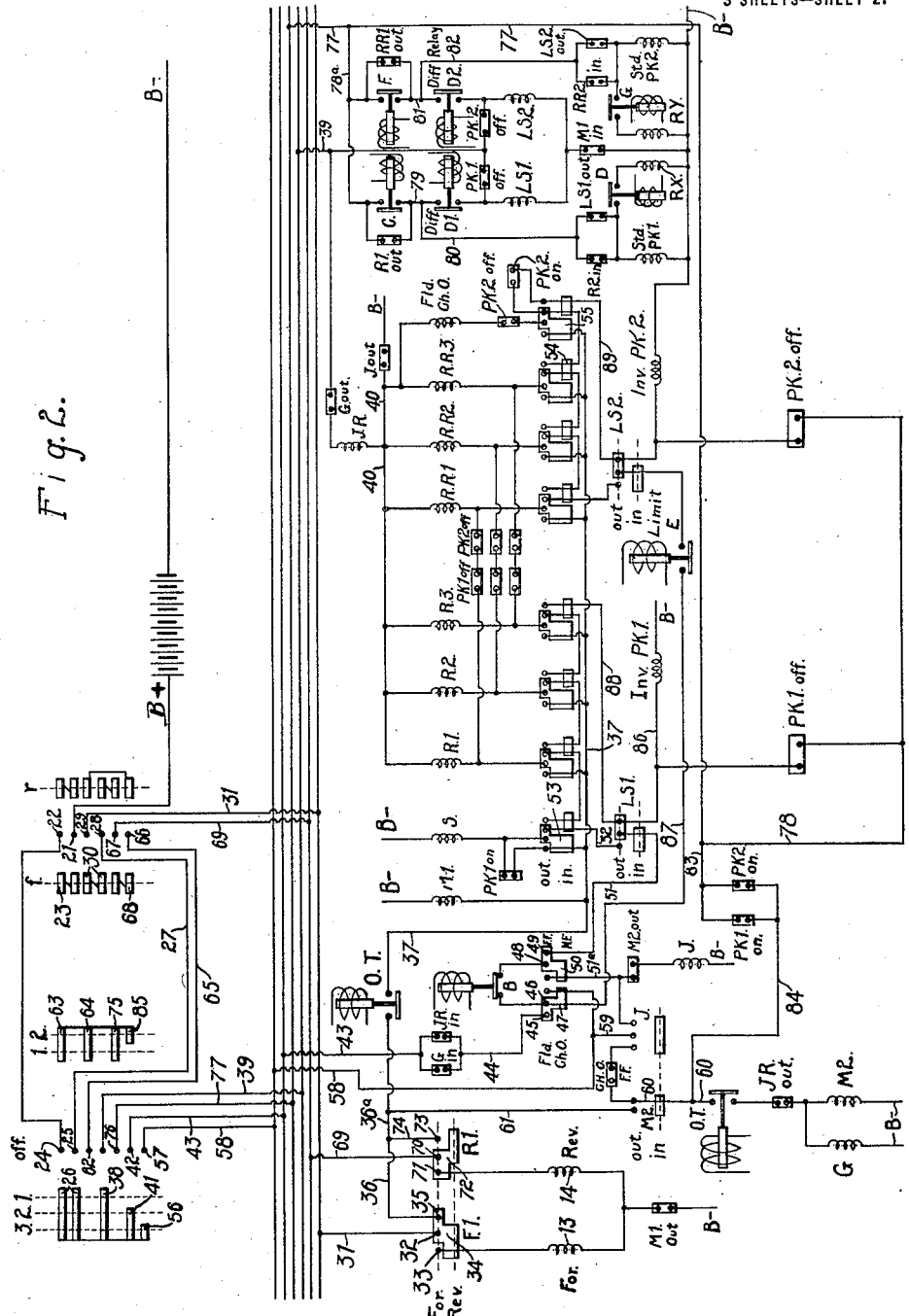

Fig. 2 is a diagrammatic view of the control circuits including the actuating coils and the interlocks which form parts of the main circuit switches and control apparatus shown in Fig. 1. In order to simplify the circuit connections, however, the interlocks which, as shown in Fig. 1, are grouped with the various switches, are distributed, and each of them is marked to indicate the switch or control device with which it is associated and by which it is operated.

Figure 3:
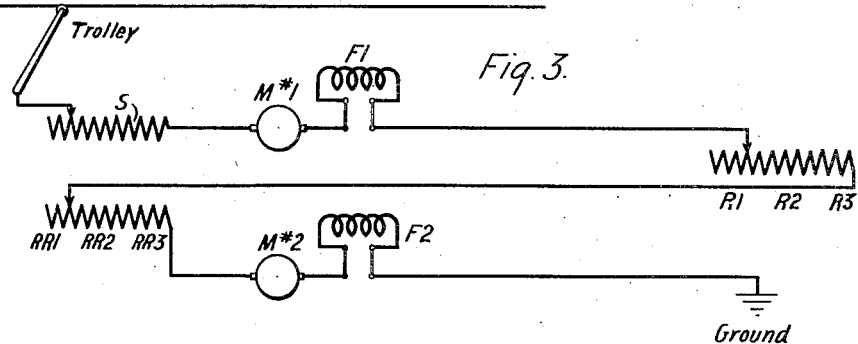
Figure 4:
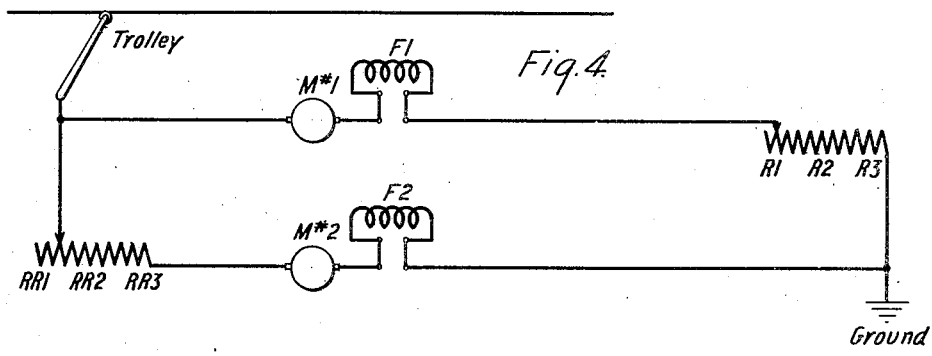
Figure 5:
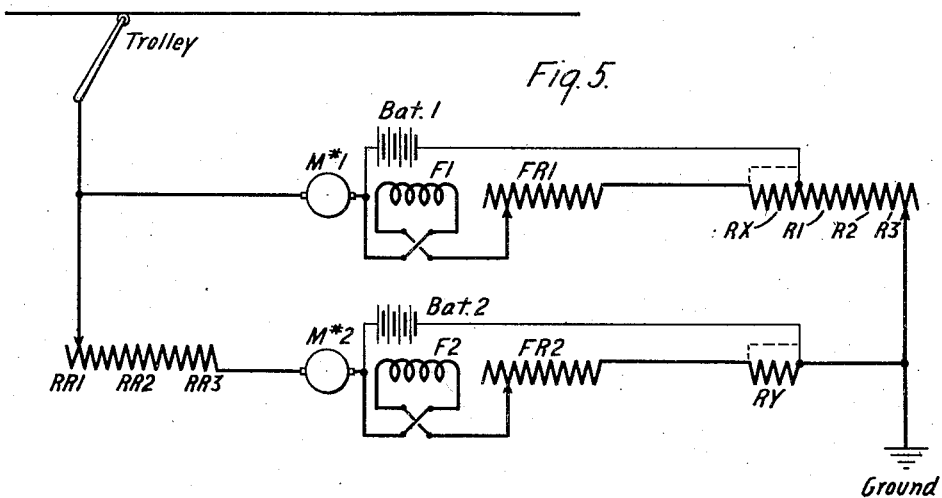

Fig. 3, Fig. 4 and Fig. 5 are simplified diagrammatic views that respectively correspond to acceleration with the motors in series relation, acceleration with the motors in parallel relation, and regeneration of the momentum-driven machines.

Referring to Fig. 1 of the drawings, the system here shown comprises a supply circuit conductor which, for convenience, is marked "Trolley"; a return circuit conductor which is marked "Ground"; a pair of electric motors having armatures marked, respectively, M#1 and M#2, and field magnet windings marked, respectively, F1 and F2; two pair of line switches marked M1, LS1, M2 and LS2; a resistor section used only when the motors are connected in series relation and adapted to be short-circuited by a switch S; a plurality of resistor sections that are adapted to be respectively short-circuited by switches R1, R2 and R3; a second group of resistor sections that are adapted to be respectively short-circuited by switches RR1, RR2 and RR3; a pair of step-by-step field-regulating resistances FR1 and FR2; a second pair of field-regulating resistances that are adapted to be respectively short-circuited by switches RX and RY; a pair of switches X1 and X2 for respectively short-circuiting the pairs of resistances FR1 and RX and FR2 and RY; storage batteries marked respectively Bat. 1 and Bat. 2; a pair of controllers for governing the step-by-step field-regulating resistances, marked PK1 and PK2; a plurality of limit switches comprising D, B and C in one group, and G, E and F in another group; a plurality of control switches JR, J and G; an overground trip relay switch OT; differential relay switches D1 and D2; a field change-over switch FC; and a reversing switch marked "Reverser".

In order to avoid confusion, each resistor section will hereinafter be designated by the reference character which is applied to its short-circuiting or excluding switch, for example; the resistor short circuited by the switch S will be termed the S resistor. Similarly, one of the motors will be referred to as motor M#1, which is the reference character applied to its armature, and the other as motor M#2.

The operation of the system with reference to the main circuits only will first be discussed and, subsequently, the control circuits, by which the desired circuit changes are accomplished, will be traced.

Assuming that it is desired to accelerate the motors, switches M1, LS1, LS2, JR and X1 and X2 are first closed, thereby establishing a circuit from the "trolley", through the switches M1 and LS1, the series resistor S, the coils of limit switches D, B, and C, the armature M#1, the full field magnet winding F1 by means of certain contact members of the reverser, the switch X1, resistor sections R1, R2 and R3, switch JR, resistor sections RR1, RR2 and RR3, the coils of limit switches G, E and F, the armature M#2, the full field magnet winding F2, by means of certain contact members of the reverser, the switch X2, and the coil of the overload trip switch OT to the "ground". The motors are thus connected in series, with all of the resistor sections included in the circuit, with the exception of the field-regulating resistor sections, which are short-circuited. Fig. 3 shows the circuit connections at this time.

The resistor sections are then gradually short-circuited to increase the motor speed. When full series position has been reached, the field change-over switches are operated to make the "normal field" connection in a well known manner.

The transition from series to parallel is of the familiar "bridging" type, in so far as the main circuits are concerned, the resistance switches being opened during the transition.

The resistor sections are then again gradually short-circuited and the motors brought to full parallel position, whereupon the field change-over switches are again actuated to the "normal field" position. The simplified circuit connections corresponding to parallel motor operation are illustrated in Fig. 4.

In braking, the field magnet winding connections, with respect to the armature, are automatically reversed for a purpose familiar to those versed in the art. The controllers PK1 and PK2 are also moved from their "off" positions to their positions 1. By these means, the switches X1 and X2 are opened and a plurality of switches Y1 and Z1 and Y2 and Z2 are closed. Inasmuch as the line switches LS1 and LS2 are open, the motors are not connected to the line. However, Bat. 1 is connected in shunt relation to the field magnet winding F1 and the field-regulating resistance FR1, while Bat. 2 is similarly connected in parallel with the field magnet winding F2 and the field regulating-resistance FR2.

The line switches LS1 and LS2 are automatically and respectively dependent upon the differential relay switches D1 and D2 and, consequently, when a predetermined relation exists between the voltages generated at the terminals of the respective motor armatures and the voltage of the line, the motors are automatically and independently connected to the line by the closing of the corresponding line switches LS1 and LS2. After the motors are connected to the circuit, the series resistances are short circuited, and the controllers PK1 and PK2, in conjunction with the switch having the Tirrill regulator action, are automatically regulated, as hereinafter pointed out, to so govern the field-regulating resistances with which they are associated as to maintain a substantially constant braking current. This obviously involves the gradual exclusion of the regulating resistances in order to maintain substantially constant generated voltages at the terminals of the motors, as their speeds decrease.

The PK controllers are intended to be representative of any suitable means for automatically governing the field-regulating resistances and I do not wish to be limited to any specified control apparatus.

Each of the PK controllers comprises a plurality of contact fingers which are connected to intermediate points in the field-regulating resistor with which it is associated; suitable contact segments which are adapted to successively engage the fingers and gradually short-circuit the resistance in a well-known manner; contact members for forming parts of the switches Y and Z; and a plurality of interlocking contact members and fingers coöperating therewith, which will be referred to in detail in the discussion of the control circuits.

Each of the controllers is preferably in the form of a drum, which is shown developed into a single plane in a well known manner, and is provided with a shaft 1 to which a pinion 2 is secured. Each of the drums is actuated by a rack 3 which meshes with its pinion 2 and is connected, at its respective ends, to pistons 4 and 5 which operate in cylinders 6 and 7. Fluid pressure is admitted from a tank or reservoir 8, through an electromagnetically controlled valve 9, to the cylinder 7, when an actuating coil 10 for the valve is deënergized, and fluid pressure is admitted from the tank or reservoir to the cylinder 6, when an actuating coil 11 for the other magnet valve 12 is energized.

The arrangement of parts is such that, if both magnet valves are deënergized, fluid pressure will be admitted through the valve 9 to the cylinder 7 and will so actuate the pistons 4 and the rack 3 as to throw the PK drum, with which it is associated, to its "off" position.

If the valve magnet 12 is energized, fluid pressure will be admitted to the cylinder 6, but no motion of the drum will result, inasmuch as the pressures are then balanced on the two sides of the piston member. A motion of the drum may be produced, however, by subsequently energizing the coil 10 of the valve 9, since, by this means, the valve 9 will cut off the supply of pressure from the reservoir and will open its exhaust port. The drum may be stopped at any position by merely deënergizing the coil 10, and it may be returned to its off position by merely deënergizing both of the coils 10 and 11.

The valve magnet 12 which, when energized, is open to admit fluid pressure to the cylinder and, when deënergized is closed to exhaust air from the cylinder, will hereinafter be referred to as a "standard" valve magnet, while the valve magnet 9, which is open to admit fluid pressure to the cylinder when deënergized, and exhausts the air from the cylinder when energized, will hereinafter be referred to as an "inverted" valve magnet.

The "reverser" may be of any suitable type, but preferably comprises a drum section which is adapted to occupy two positions, one for forward and the other for reverse operation of the vehicle. It is preferably pneumatically operated, and is controlled by valves having actuating coils 13 and 14.

The limit switches C and F are closed when energized above a predetermined value, and the switches D, B, G and E are opened when energized above predetermined values.

Each of the differential relay switches D1 and D2 is provided with a coil 15 which, when energized, tends to raise it, and a coil 16 which tends to hold it down.

The coils 15 are respectively connected in shunt relation to the armatures M1 and M2 when the PK drums occupy any "on" position, of which, for illustrative purposes, I have shown eight, by reason of the engagement of contact fingers 17 with a contact member 18. The coils 16 are similarly connected across the supply circuit in the "on" position of the PK drums, by reason of the engagement of contact fingers 19 with a contact member 20.

Referring to Fig. 2 of the drawings, the control circuits here shown are governed by a master controller that is adapted to occupy an "off" position, accelerating positions, 1, 2 and 3, a holding position 1 and a braking position 2; and a master reverser that is adapted to occupy a forward position $f$ and a reversing position $r$.

Energy may be supplied to the control circuits from any suitable source, such as a control battery having a positive terminal which, together with its connected conductors, is marked B+ and a negative terminal which, with its connected conductors, is marked B−.

The arrangement of circuits is such that, if the master controller is moved to its position 3, the motor acceleration will progress automatically until the motors are finally connected across the line in multiple circuit relation. If the master controller is moved only to position 2, the acceleration will progress until the motors are connected across the line in series relation and, if moved only to position 1, the motors will be connected in series relation across the line, with all the accelerating resistance in series.

It is thus evident that automatic acceleration is provided for, but that the progression may be delayed at several points, according to the will of the operator.

Assuming that the master controller is moved from its "off" position to its accelerating position 3; that the master reverser has been thrown into its position $f$, and that the reverser occupies its position $r$, a control circuit is established from the control battery terminal and conductor B+, control fingers 21 and 22, which are bridged by a contact member 23 of the master reverser, contact fingers 24 and 25, which are bridged by a contact member 26 of the master controller, conductor 27, control fingers 28 and 29, which are bridged by a contact member 30 of the master reverser, conductor 31, control fingers 32 and 33, which are bridged by a contact member 34 of the reverser, the "forward" coil 13 of the reverser, and the interlock marked "M1 out" to the negative control conductor B—. The reverser is thus thrown to the forward position.

A circuit is thereupon established from the contact member 34, through a control finger 35, conductor 36, stationary auxiliary contact member of the overload trip OT, conductor 37 and the coil of the switch M1 to the conductor B—, the switch being thus closed.

Another circuit is established from an energized contact member 38 of the master controller through conductor 39, two parallel circuits, one of which includes an interlock marked "PK1 off" and the coil of the line switch LS1, and the other of which includes an interlock marked "PK2 off" and the coil of the line switch LS2, and then through a common interlock marked "M1 in" to the control conductor B—. Also, a circuit is completed from the conductor 39 through an interlock marked "G out," the coil of the switch JR, a conductor 40, an interlock marked "J out" and to the conductor B—. In this way, the line switches LS1 and LS2 and the switch JR are closed, and the motors are connected across the line, with all the accelerating resistance in series.

When the current has dropped below a predetermined value for which the limit switch B is set, the switch assumes its lower position, and a circuit is established from an energized contact member 41 of the controller, through a control finger 42, conductor 43, interlock marked "JR in," conductor 44, control fingers 45 and 46, which are bridged by a contact member 47 of the field change-over switch when in its "full field" position, stationary auxiliary contact members of the limit switch B, control fingers 48 and 49, which are bridged by a contact member 50 of the field change-over switch, conductor 51, interlock marked "LS1—in," conductor 52, contact member 53 of the switch S and the coil of that switch to the conductor B—. When the switch S is closed, a circuit is progressively made through the coils of switches R1, R2 and R3 to the conductor 40, dependent upon the limit switch B, in accordance with familiar practice, the magnet coils, after closure of the switches, being transferred to the holding conductor 37.

A similar circuit is also established from the control finger 46 of the field change-over switch, through auxiliary contact members of the limit switch E and an interlock marked "LS2—in" to the coils of the switches RR1, RR2 and RR3, which are thus also closed. Other circuits are respectively established between the pairs of coils of the switches R1 and RR1, R2 and RR2, R3 and RR3, each of these circuits including series-connected interlocks marked "PK1 off" and "PK2 off," thereby insuring the closure of the RR1 set of switches substantially simultaneously with the corresponding switches of the R1 set, unless the energization of the RR1 set through the limit switch E has caused a prior closure of that set. The resistances are thus short-circuited as rapidly as is consistent with good operation, thus increasing the efficiency of acceleration. As a means of obtaining further increase of efficiency, after the resistances are all short-circuited the field change-over switch is actuated to its "normal field" position by the energization of the magnet coil of the switch from a contact member 54 of the switch RR3, through contact member 55 of the field change-over switch, and interlock marked "PK2 off." The motors are thus connected in full series relation with "normal field" connection.

When the field change-over switch is actuated, a circuit is established from an energized contact member 56 of the master controller, through a control finger 57, conductor 58, the contact member 47 of the field change-over switch, stationary contact members of the limit switch B, when it occupies its lower position, the contact member 50, conductor 51$^a$, interlock marked "M2 out," and the coil of switch J to the conductor B—. The switch J is thus closed when the limit switch B is closed. The switches R, R1, R2, R3, RR1, RR2, RR3, and field change-over are thereupon opened, by reason of the interlock marked "J out" in the conductor 40. A circuit is then established from the conductor 58, through a conductor 59, interlock marked "J—in," interlock marked Ch. O. F. F., meaning "change-over switch full field," conductor 60, stationary auxiliary contact members of the overload trip OT, interlock marked "JR out," and the coils of the switches M2 and G to the conductor B—. Upon the closure of the switch M2, the switch J is opened, by reason of the inclusion in its control circuit of the interlock marked "M2 out." It will thus be seen that the motors have been changed from series to parallel connection by means of the familiar "bridging" transition, in so far as the main circuits are concerned. When the switch J drops out, the above-mentioned control circuit of the switches M2 and G is opened at the point marked "J—out," but a new circuit is established from the conductor 36, through a conductor 61 and an interlock marked "M2—in" to the conductor 60.

As soon as the switch G is closed, a circuit is completed between the conductors 43 and 44 by means of an interlock marked "G in". The coils of the switches R1, R2, R3; RR1, RR2, RR3, and the field changeover are then energized, as hereinbefore described, the motors being finally disposed in full parallel relation, with "normal field" connection.

It will be observed that the holding circuit of the switch S is independent of the position of the switch J and, consequently, the switch S remains closed during the complete operation of the controller, after it has once been actuated.

A substantially balanced relation is maintained between the two parallel motor circuits by reason of the fact that the control circuits of the corresponding switches of the two motor circuits are tied to each other, as hereinbefore described, thereby insuring similar main circuit conditions and equal division of the load.

Referring to the regenerative circuits, let it be assumed that the vehicle is being propelled by the motors at or above a predetermined rate of speed, and that the master controller is returned to its off position, permitting all the switches to open, and is moved to its braking position; under these conditions, energy is supplied from the energized control finger 24 to a control finger 62, which fingers are connected by contact members 63 and 64 of the master controller, conductor 65, control fingers 66 and 67, which are bridged by a contact member 68 of the master reverser, conductor 69, control fingers 70 and 71, which are bridged by a contact member 72 of the reverser, the reverse coil 14 thereof, and the interlock marked "M1 out" to the conductor B—. The reverser is thus thrown to its reverse position without operating the master reverser. Upon actuation of the reverser, a circuit is established from control fingers 70 and 73, which are now bridged by the contact member 72, conductor 74 and conductor 36ᵃ to the coil of the switch M1, which is thus closed.

Another circuit is established from an energized contact member 75 of the master controller, through a control finger 76, and conductors 77 and 78, where the circuit divides, one branch including a contact member marked "PK1 off" and the inverted valve magnet of PK1 controller and also including a contact member marked "PK2 off" and the inverted valve magnet of PK2 controller, the two magnet valve coil circuits just mentioned being connected in multiple. The other branch from the conductor 77 includes conductor 78ᵃ, where the circuit again divides, one line comprising an interlock "R1 out", which bridges auxiliary contact members of the low-current limit switch C, conductors 79 and 80, an interlock marked "LS1 out", directly through the standard valve magnet coil of the PK1 controller and also through a circuit that is in shunt to this coil and that includes auxiliary contact members of the high-current limit switch D and the coil of the switch RX. The other line leading from conductor 78ᵃ includes an interlock marked "RR1 out" which bridges auxiliary contact members of the low-current limit switch F, conductors 81 and 82, an interlock marked "LS2 out", directly through the standard valve magnet coil of the PK2 controller, and also through a circuit that is in shunt to the coil and that includes auxiliary contact members of the high-current limit switch G and the coil of the switch RY.

As soon as both the inverted and the standard valve magnets of the respective PK controllers are energized, the controllers are moved to open the switches X1 and X2 and close the battery switches Y1 and Y2, and Z1 and Z2, Bat. 1 thereby bridging the field magnet winding F1 and the resistances FR1 and RX, and Bat. 2 bridging the field magnet winding F2 and the resistances FR2 and RY. The switch S also is closed, by reason of the connection of its coil through an interlock marked "PK1 on" to the holding conductor 37. At this stage of the control operation, a connection is established, although the circuit is not completed because the line switch LS1 is open, from one terminal of the switch, through the switch S, the coils of the limit switches D, B and C, the armature M#1, the field F1 in the reverse direction, the resistances FR1 and RX, which are bridged by Bat. 1, the resistances R1, R2 and R3, and the switch G to "ground". The motor M#2 is included in a similar circuit. The storage batteries serve to excite the field magnet windings with which they are associated, and, inasmuch as the vehicle is assumed to be operating at a predetermined speed, the motors will act as generators the voltages of which are dependent upon the speed. When the circuits are in the condition just described, however, the generated electro-motive forces are somewhat lower than the electromotive force of the supply line and, consequently, the differential relay switches remain down.

The PK controllers are stopped in their first operative position by reason of the breaking of the circuits of the inverted valve magnets at the contact members marked respectively "PK1 off" and "PK2 off". Upon this actuation of the PK controllers, a circuit is completed from the conductor 77, through conductor 83, parallel-connected interlocks marked, respectively, "PK1 on" and "PK2 on", conductor 84, and the conductor 60, and through the coils of the switches M2 and G.

A circuit is then established from an energized contact member 85 of the master controller, through the control finger 42, the conductor 43, the interlock marked "G in," conductor 44, the field change-over switch contact members 47 and 50 between which are interposed the auxiliary contact members of the limit switch B, the conductor 51, interlock marked "LS1 out," conductor 86 and the inverted valve magnet coil of the PK1 controller to the conductors B—. A similar circuit is established from the field change-over switch contact member 47, conductor 87, auxiliary contact members of the limit switch E, interlock marked "LS2—out," and the inverted valve magnet coil of the PK2 controller to the conductor B—. Since the standard valve magnets are also energized, an independent forward step-by-step movement of the PK controllers occurs, thus gradually excluding the field-regulating resistance from the circuit of each motor until the voltage generated at the armature terminals thereof reaches a predetermined value, which is in excess of the line voltage at least by an amount equal to the battery voltage, whereupon the corresponding differential relay switch D1 or D2 will be raised.

Upon the actuation of the D1 relay switch a circuit is completed from the conductor 79, through contact members of the relay switch, the coil of the line switch LS1 and the interlock marked "M1 in" to the negative conductor B—. A similar circuit is closed through the coil of the line switch LS2 as soon as the relay switch D2 is raised. The two motors are thus independently connected to the line for regeneration, the simplified initial regenerative connections being shown in Fig. 5.

Upon the closure of the line switch LS1, the circuit through the coil of the switch RX is opened at the interlock marked "LS1 out," whereupon the switch is opened to insert the resistance RX in the circuit of motor M#1 at the instant of connection to the line. Moreover, the circuits of both the standard and inverted valve magnet coils of the PK1 controller are similarly broken at the interlocks marked "LS1 out" in the respective circuits, thereby causing a backward movement of the controller to likewise insert resistance in the circuit. In application, Serial No. 724,068, hereinbefore mentioned, only the latter means for preventing the increase of battery voltage and consequent initial rush of regenerated current that otherwise would occur, was shown. The RX switch and resistance, however, have been found to accomplish the desired result more rapidly and, consequently, to better advantage. Moreover, the above-mentioned instantaneous insertion, in the armature circuit, of the resistor RX, together with the concurrent return of the PK1 controller toward its "off" position until the R2 switch closes, as hereinafter noted, causes relatively rapid exclusion of the resistors R1, R2, and R3, thereby increasing the efficiency of regeneration, as explained below. The use of such a system is claimed broadly in a copending application of Norman W. Storer, Serial No. 829,439, filed April 4, 1914, and assigned to the Westinghouse Electric & Manufacturing Company. Various novel circuit connections that are brought about by means of this feature, will hereinafter be pointed out.

As soon as the braking current has been caused to diminish, as just recited, sufficiently to allow the limit switch B to assume its lower position, a circuit is established therethrough through the interlock marked "LS1 in," and the interlock that is movable with the now closed switch S, to the coils of the switches R1, R2 and R3 in relatively rapid succession, dependent upon the limit switch B, which, however, will probably remain down, by reason of the decreased armature current generated when the field resistance is increased in the manner described above, thus increasing the regenerative efficiency. Although the movement of the PK1 controller is arrested when the R2 switch closes, the closure of the following resistor switches will not be delayed, by reason of the fact that the inductance of the field winding circuit prevents the field current from following the changes in the field-circuit resistance immediately, and consequently, the effect of the insertion of the PK resistance will be felt, after the controller has stopped, for a sufficiently long time to allow the resistor switches that follow the R2 switch in the sequence of operation to be closed.

Direct connections between the coils of the R1 set of switches and coils of the RR1 set are now broken at the series-connected interlocks marked "PK1 off" and "PK2 off," and the coils of the RR1 set are successively energized through the limit switch E. The coil of the field change-over switch is not energized, by reason of the interruption of its circuit at the interlock marked "PK2 off." However, as soon as the R3 switch is closed, a circuit is completed from contact members thereof, through conductors 88 and 86, and the coil of the inverted valve magnet of the PK1 controller. A similar circuit is completed from contact members of the RR3 switch as soon as it is closed, through contact members of the field change-over switch, an interlock marked "PK2 on," conductor 89, and the coil of the inverted magnet of the PK2 controller.

Upon the closure of the R1 switch, the circuit between conductors 78$^a$ and 79 is broken at the interlock marked "R1 out," but this interlock has already been bridged, upon connection of the motor to the line, by the low-current limit switch C. Also, upon the closure of the R2 switch, the circuit between conductor 80 and the standard valve magnet coil of the PK1 controller and coil of the switch RX is again completed by means of an interlock marked "R2 in." These coils are, consequently, energized. The inverted valve magnet coil being also energized when the R3 switch closes, the PK1 controller will then again move forward, dependent upon the limit switch B.

From this time, the RX switch will work in conjunction with the PK1 controller to maintain a substantially constant braking current, in the following manner. When the regenerated current diminishes to a certain value, the limit switch B will drop to allow forward movement of the PK controller. Upon the current exceeding another predetermined value, however, the limit switch D will be raised to deënergize the coil of the switch RX and thus insert the resistance RX in the circuit of the motor M#1, to prevent the incipient current peak. In operation, as hereinbefore mentioned, the RX switch flutters open and closed like the contact members of a Tirrill regulator, thereby maintaining the regenerated current within relatively narrow limits. Oscillograph records of current taken with and without the inclusion of the RX switch show the excellent current-regulating properties of the combination of the PK controller and the RX switch.

While I have not considered it necessary, in every case, to describe the circuits of the motor M#2, it will be understood that the circuit arrangements and connections thereof that are not specially mentioned correspond exactly to those of the motor M#1.

When the speed of the vehicle and consequent regenerated current falls to a relatively low value, that is, after the PK controllers have attained their last operative positions, the air brakes may automatically be set, if desired, as disclosed in the co-pending application of Serial No. 724,068, hereinbefore mentioned. The low-current limit switches C and F will drop out, as will also the differential relay switches D1 and D2, thereby opening up the line switches and disconnecting the motors from the line.

While the master controller is provided with a braking and a holding position, the holding position, it will be noted, differs from the braking position only in that the circuits of the inverted valve magnet coils of the PK controllers are interrupted. By this means, the progression of the controllers may be arrested at any point and so cause the speed of the vehicle to decrease more slowly or continue at a constant speed if it is operating down hill. This enables the operator, by moving his controller from one position to the other, to regulate the rate of retardation or to hold any speed on down grade.

While I have shown preferred circuit connections and arrangement of parts, I wish it to be understood that variations thereof may be made within the spirit and scope of my invention. I, therefore, desire that only such limitations shall be imposed as are indicated in the appended claims.

I claim as my invention:

1. In a system of control, the combination with a supply circuit, an electric motor having an armature and a field magnet winding, a field-regulating resistance, means for separately exciting the field magnet winding, and a subdivided resistance in the armature circuit, of means for connecting the motor to the supply circuit to return energy thereto under predetermined voltage conditions, means for progressively including said field-regulating resistance in circuit to limit the initially regenerated current, means for excluding said subdivided resistance, and means for arresting the inclusion of said field-regulating resistance upon the exclusion of a predetermined amount of said subdivided resistance.

2. In a system of control, the combination with a supply circuit, an electric motor having an armature and a field magnet winding, a field-regulating resistance, means for separately exciting the field magnet winding, and a subdivided resistance in the armature circuit, of means for connecting the motor to the supply circuit to return energy thereto when the armature voltage exceeds the supply circuit voltage by a predetermined amount, electro-responsive means for progressively including said field-regulating resistance in circuit to limit the initially regenerated current, switching means for concurrently excluding said subdivided resistance, and contact-making means dependent upon the exclusion of a predetermined amount of said subdivided resistance for arresting the inclusion of said field-regulating resistance.

3. In a system of control, the combination with a supply circuit, an electric motor having an armature and a field magnet winding, a normally short-circuited field-regulating resistance, a storage battery for separately exciting the field magnet winding, a plurality of resistors, and a plurality of short-circuiting switches for said resistors, of a differential relay switch for automatically connecting the motor to the supply circuit to return energy thereto when the voltage generated at the motor terminals exceeds the supply circuit voltage by a predetermined amount, fluid-pressure operated means for automatically progressively including said field-regulating resistance in circuit and limiting the initially regenerated current, means for concurrently successively actuating said short-circuiting switches, and contact-making means dependent upon the actuation of one of said switches for arresting the movement of said fluid-pressure operated means.

4. In a system of control, the combination with a supply circuit, an electric motor having an armature and a field magnet winding, a field-regulating resistance, means for separately exciting the field magnet winding, a subdivided resistance connected in the armature circuit and an auxiliary resistance, of means for connecting the motor to the supply circuit to return energy thereto, under predetermined voltage conditions, means for inserting said auxiliary resistance in circuit at the instant of said connection and means for concurrently and progressively including said field-regulating resistance in circuit to maintain the initially regenerated current below an excessive value, means dependent upon circuit conditions for rapidly excluding said sub-divided resistance, and means for arresting the inclusion of said field-regulating resistance when a predetermined amount of said subdivided resistance has been excluded.

5. In a system of control, the combination with a supply circuit, an electric motor having an armature and a field magnet winding, a field-regulating resistance, means for separately exciting the field magnet winding, a subdivided resistance connected in the armature circuit, and an auxiliary resistance, of means for connecting the motor to the supply circuit to return energy thereto when the armature voltage exceeds the supply circuit voltage by a predetermined amount, means for inserting said auxiliary resistance in circuit at the instant of said connection, an electro-responsive means for concurrently and progressively including said field-regulating resistance in circuit to maintain the initially regenerated current below an excessive value, means dependent upon circuit conditions for rapidly excluding said subdivided resistance, and means for arresting the inclusion of said field regulating resistance when a predetermined amount of said subdivided resistance has been excluded.

6. In a system of control, the combination with a supply circuit, an electric motor having an armature and a field-magnet winding, a normally short-circuited field-regulating resistance, a storage battery for separately exciting the field magnet winding, a plurality of armature circuit resistors, a plurality of short-circuiting switches therefor, an auxiliary resistor, a short-circuiting switch therefor, of means for connecting said battery across said field magnet winding and said field-regulating resistance, a differential relay switch for automatically connecting the motor to the supply circuit to return energy thereto when the voltage generated at the motor terminals exceeds the supply circuit voltage by a predetermined amount, means for opening the short-circuiting switch for said auxiliary resistor to insert the resistor in circuit at the instant of said automatic connection, a fluid-pressure operated means for concurrently and progressively including said field-regulating resistance in circuit to limit the initially regenerated current, means for concurrently actuating said plurality of short-circuiting switches in rapid succession, and contact-making means dependent upon the actuation of one of said switches for arresting the movement of said fluid-pressure operated means.

7. A system of control for braking an electric motor comprising a supply circuit, an electric motor having an armature and a field magnet winding, a variable resistance, an auxiliary source of current, a translating device, means for connecting the said source, said resistance and said translating device in circuit with the field magnet winding, means for regulating the said variable resistance in accordance with the current and electro-motive force generated by the armature, means for connecting the motor to the supply circuit when the voltage generated by the motor attains a predetermined value, means for thereupon actuating said resistance-regulating means toward its position of highest effective resistance, and means for excluding said translating device from circuit when said regulating means returns beyond a predetermined position.

8. A system of control for braking an electric motor comprising a supply circuit, an electric motor having an armature and a field magnet winding, a variable resistance, a storage battery, a resistor, means for connecting said battery, said resistance and said resistor in circuit with the field-magnet winding, means for automatically regulating the said variable resistance in accordance with the current and electromotive force generated by the armature, a differential relay switch for connecting the motor to the supply circuit when the voltage generated by the motor attains a predetermined value, means for thereupon returning said resistance-regulating means toward its initial operative position of highest effective resistance, and contact-making means for excluding said translating device from circuit in case said regulating means causes the regenerated current to drop below a predetermined value.

In testimony whereof, I have hereunto subscribed my name this 18th day of April, 1914.

ARTHUR J. HALL.

Witnesses:
G. R. Irwin,
B. B. Hines.